US012752910B2

(12) United States Patent
Tos et al.

(10) Patent No.: US 12,752,910 B2
(45) Date of Patent: Oct. 6, 2026

(54) MULTI-PURPOSE ATTACHMENT STRUCTURE

(71) Applicant: Pipistrel d.o.o., Ajdovscina (SI)

(72) Inventors: Patrik Tos, Smarje (SI); Gregor Cretnik, Ljubljana (SI); Crt Sambolec, Begunje na Gorenjskem (SI)

(73) Assignee: Pipistrel d.o.o., Ajdovscina (SI)

( * ) Notice: Subject to any disclaimer, the term of this patent is extended or adjusted under 35 U.S.C. 154(b) by 30 days.

(21) Appl. No.: 18/823,269

(22) Filed: Sep. 3, 2024

(65) Prior Publication Data

US 2026/0062120 A1 Mar. 5, 2026

(51) Int. Cl.

| | |
|---|---|
| ***B64C 25/00*** | (2006.01) |
| ***B64C 1/16*** | (2006.01) |
| *B64C 1/26* | (2006.01) |
| *B64C 3/32* | (2006.01) |
| *B64C 9/02* | (2006.01) |
| *B64C 25/04* | (2006.01) |

(52) U.S. Cl.

CPC .............. *B64C 25/001* (2013.01); *B64C 1/16* (2013.01); *B64C 1/26* (2013.01); *B64C 3/32* (2013.01); *B64C 9/02* (2013.01); *B64C 25/04* (2013.01)

(58) Field of Classification Search

CPC ......... B64C 25/001; B64C 25/04; B64C 1/16; B64C 1/26; B64C 3/32; B64C 9/02

See application file for complete search history.

(56) References Cited

U.S. PATENT DOCUMENTS

| | | | | |
|---|---|---|---|---|
| 10,351,224 | B2 * | 7/2019 | Harleman | B64C 7/00 |
| 11,492,106 | B2 | 11/2022 | Noppel et al. | |
| 11,993,369 | B2 | 5/2024 | Bevirt et al. | |
| 2017/0225780 | A1 * | 8/2017 | Kooiman | B64C 27/12 |
| 2019/0217950 | A1 | 7/2019 | McCullough et al. | |
| 2021/0291968 | A1 | 9/2021 | Tischhauser | |
| 2023/0242283 | A1 | 8/2023 | Tian | |
| 2023/0348036 | A1 | 11/2023 | Page | |
| 2025/0276781 | A1 * | 9/2025 | Cretnik | B64C 1/26 |

FOREIGN PATENT DOCUMENTS

| | | | |
|---|---|---|---|
| EP | 3495267 | A1 | 6/2019 |
| EP | 4566945 | A1 | 6/2025 |

OTHER PUBLICATIONS

Extended European Search Report issued Nov. 27, 2025 in corresponding EP Application No. 25194331.2, 10 pages.

* cited by examiner

*Primary Examiner* — Richard G Davis
(74) *Attorney, Agent, or Firm* — Avek IP, LLC

(57) ABSTRACT

In certain embodiments, a structural mount in an aircraft includes a bottom assembly including a plurality of rigid trusses disposed within an aircraft structure. The bottom assembly is configured to pivot relative to the aircraft structure via a pivot mount. A plurality of adjustable mounts are disposed on top of the bottom assembly. A top assembly is mounted to the plurality of adjustable mounts. The adjustable mounts are used to adjust a position of the top assembly. A mechanical linkage is mounted to the bottom assembly. The mechanical linkage may be configured to adjust a control surface external to the bottom assembly.

20 Claims, 16 Drawing Sheets

MULTI-PURPOSE ATTACHMENT STRUCTURE

BACKGROUND

1. Field

The disclosed embodiments relate generally to the field of aerospace. More specifically, the disclosed embodiments are related to attachment structures within aircraft.

2. Related Art

Attachment structures, particularly structural pylons, are common in aircraft for mounting engine components to wings. Certain aircraft, such as the de Havilland Canada DHC-8, comprise long engine structures mounted to the wings wherein the wings bear the weight of the entire engine structure with attachment structures embedded into the engine structure. U.S. Pat. No. 11,993,369 B2 to Bevirt et al discloses an electric tilt rotor aircraft comprising a tilting propulsion assembly mounted on a wing and configured to pivot relative to the wing. U.S. Pat. No. 11,492,106 B2 to Noppel et al discloses a vertical take-off and landing (VTOL) aircraft configured with a plurality of engine modules pivotally coupled to the wing. US Publication No. 2019/0217950 A1 to McCullough et al discloses an aircraft with a plurality of propulsion assemblies configured to rest and pivot on an airframe. US Publication No. 2023/0348036 A1 to Page discloses a system for modular aircraft comprising a common component onto which a plurality of other components are mounted, including a flight component and a component with a wing.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In certain embodiments, a structural mount in an aircraft includes: a bottom assembly including a plurality of rigid trusses disposed within an aircraft structure, wherein the bottom assembly is configured to pivot relative to the aircraft structure via a pivot mount; a plurality of adjustable mounts disposed on top of the bottom assembly; a top assembly mounted to the plurality of adjustable mounts, wherein adjusting the adjustable mounts adjusts a position of the top assembly; and a mechanical linkage mounted to the bottom assembly, wherein the mechanical linkage is configured to adjust a control surface external to the bottom assembly.

In certain embodiments, a structural mount includes a servo motor disposed within the bottom assembly wherein the servo motor is configured to adjust the mechanical linkage.

In certain embodiments, a structural mount includes a shock absorber mounted in the bottom assembly, wherein the shock absorber is rigidly secured in the bottom assembly.

In certain embodiments, the pivot mount includes: a circular portion in the aircraft structure outfitted with an aircraft structure bushing; a structural mount bushing configured in a rigid truss; a center attachment pin disposed in the structural mount bushing and the aircraft structure bushing; a flange at an end of the center attachment pin and interfaced to the aircraft structure bushing; and a plurality of bolts securing the flange to the aircraft structure bushing, wherein the aircraft structure bushing is configured to rotate within the circular portion.

In certain embodiments, the top assembly includes a wishbone bracket with a slot configured to mount to a wing of the aircraft.

In certain embodiments, the bottom assembly includes a mounting slot for mounting an adjustment bracket, the adjustment bracket including: a shell with a cutout; a shoulder bolt; a central adjustment bushing in the cutout configured to receive the shoulder bolt; a side bolt configured in a side of the adjustment bracket, wherein an end of the side bolt is disposed in the cutout and tightening of the side bolt moves the end deeper into the cutout; and a lock nut configured on the side bolt for securing the side bolt in place, wherein the side bolt is tightened or loosened to adjust a position of the wishbone bracket by pushing against the central adjustment bushing.

In certain embodiments, the mounting slot includes: an oval slot, wherein the central adjustment bushing includes an oval shape configured to slide within the oval slot; and a second bushing configured in the wishbone bracket and disposed adjacent to the central adjustment bushing such that the shoulder bolt fits through the central adjustment bushing and the second bushing.

In certain embodiments, a structural mount includes a pin wherein the pin is slotted through the slot in the wishbone bracket; a slot in the wing structure wherein the pin is slotted through the slot in the wing structure; and a nut and a bolt configured on the pin for securing the wing structure to the wishbone bracket.

In certain embodiments, the top assembly includes two wishbone brackets configured to mount a wing structure on two sides via slotting pins through the top assembly mounts and wing structure.

In certain embodiments, the position of the wing structure is adjusted by adjustment of the adjustment brackets.

In certain embodiments, an attachment structure for an aircraft includes: a bottom assembly, including; a bottom bracket including a top hole and an extension with a bottom hole, wherein the extension is hollow such that a space exists through the bottom hole, the extension, and the top hole; a side plate mounted to the bottom bracket wherein the side plate includes a mirror-symmetric rigid truss arranged perpendicular to the bottom bracket; a top bracket mounted on the side plate and configured with a hole, wherein the hole aligns with the top hole and the bottom hole of the bottom bracket; a torsion link bracket mounted to the side plate; a torsion crosslink, wherein the torsion crosslink is rigidly fixed to the torsion link bracket and to the side plate; and a mounting slot disposed on a top corner of the side plate; and a top assembly, including: a wishbone bracket, wherein the wishbone bracket is mounted via a shoulder bolt into a mounting slot of the bottom assembly; and a top assembly mount disposed adjacent to the mounting slot and configured for mounting the wishbone bracket.

In certain embodiments, the bottom assembly is mounted within a boom structure and a wing structure is mounted on the top assembly.

In certain embodiments, an attachment structure, includes a shock absorber with a piston and piston sleeve, wherein the piston sleeve is slotted through the bottom hole, the extension, and the top hole of the bottom bracket and secured to the hole in the top bracket via a nut; and a landing disc secured to an end of the piston.

In certain embodiments, an attachment structure includes a supporting region of the extension of the bottom bracket configured to snugly fit radially around the shock absorber.

In certain embodiments, an attachment structure includes: a plurality of modular adaptors configured to mount components to the bottom assembly; an actuator mounted on an adaptor and disposed in a space of the bottom assembly; a first mechanical linkage configured on the bottom assembly, wherein a force from the actuator engages the first mechanical linkage; and a second mechanical linkage configured on the wing structure, wherein a force from the first mechanical linkage is transmitted to the second mechanical linkage to adjust a control surface on the aircraft.

In certain embodiments, an aircraft structural member includes: two side plates arranged opposite one another, wherein the two side plates are identical trusses each having vertical mirror symmetry; a bottom bracket mounted between the two side plates at a bottom of each side plate, wherein the bottom bracket includes a vertical hole and an elongated member; a top bracket mounted between the two side plates above the bottom bracket, wherein the top bracket includes a vertical hole; two torsion link plates mounted between the two side plates; two cross link members, each mounted to the two torsion link plates, the two side plates, and the bottom bracket; a plurality of adaptors for mounting components to the structural member; and two top mount brackets, wherein the two top mount brackets are configured for mounting the aircraft structural member to a wing of the aircraft via pins, and wherein the aircraft structural member is further mounted within a boom of the aircraft separate from the wing.

In certain embodiments, an aircraft structural member includes: a servo motor mounted on one of the two side plates via an adaptor; an extending member extending from the servo motor and passing through an open space in one of the two torsion link plates; and a mechanical linkage mounted on at least one adaptor, wherein the extending member of the servo motor actuates the mechanical linkage when the servo motor applies a force.

In certain embodiments, an aircraft structural member includes: a pivot tube with a flange; a pivot bushing disposed within each of the two side plates; a boom pivot bushing disposed on opposite sides of the boom; and a boom pivot ring, wherein the boom pivot bushing is disposed in the boom pivot ring and the boom pivot bushing is free to rotate in one direction within the boom pivot ring, wherein the flange of the pivot tube is bolted into the boom pivot bushing such that the aircraft structural member pivots relative to the boom by rotating on the pivot tube.

In certain embodiments, an aircraft structural member includes; four adjustable mounting brackets, wherein two of the adjustable mounting brackets are disposed on each side plate, and wherein each adjustable mounting bracket lies opposite another adjustable mounting bracket on the opposite side plate for mounting components; two oval slots configured on each side plate adjacent to the adjustable mounting brackets; and a shoulder bolt configured in the adjustment bracket and the oval slots, wherein the shoulder bolt mounts the top mounting brackets to the two side plates, and wherein a position of the top mounting brackets relative to the two side plates is adjusted by sliding the shoulder bolt within the oval slot.

In certain embodiments, an aircraft structural member includes: a shock absorber disposed in the vertical hole of the bottom bracket and the vertical hole of the top bracket, wherein the shock absorber is rigidly fixed to the aircraft structural member; and a landing gear secured to an end of the shock absorber.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1A:
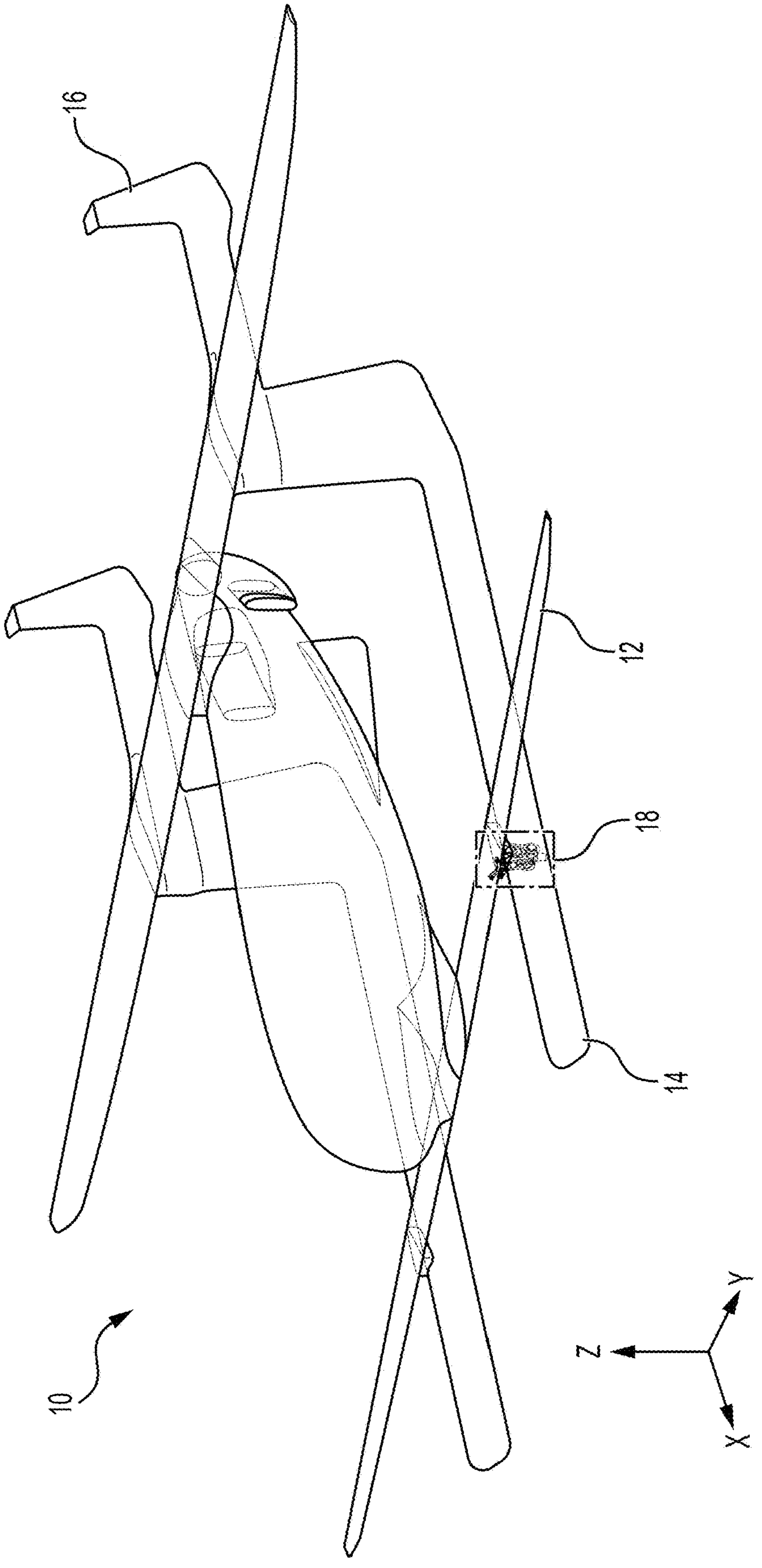
FIG. 1A is a view of an aircraft comprising a multi-purpose attachment structure assembly.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments, but is not necessarily included. Thus, the technology can include a variety of combinations and/or integrations of the embodiments described herein.

Aircraft must achieve a sufficiently low weight to ensure flightworthiness without the omission of components necessary for aircraft control, flight safety, and other aircraft operations. Such equipment, including landing gear, flight control systems, and aircraft structural elements are typically attached to separate mountings such as pylons. Traditional aircraft pylon designs typically attach large aircraft engines to wings and are used for cases wherein only a single component is mounted or otherwise configured on the pylon. Additionally, pylons typically comprise aerodynamic features as they are exposed on the surface of aircraft rather than embedded within aircraft structures.

However, using a plurality of mountings for seemingly unrelated pieces of equipment can increase aircraft mass and manufacturing complexity. Attaching several aircraft primary structural elements with complicated load paths to a single area with the added requirement for adjustability of relative position of upper and lower segments may be required on some modern aircraft designs. Thus, it is desirable to enable various systems, structures, equipment, etc. to be simultaneously attached and/or integrated onto a single portion of the aircraft for the reduction of overall design complexity and total aircraft mass.

Embodiments of the present invention describe a multi-purpose aircraft attachment structure configured as a connecting structure between a boom and a wing that may also mount a flight control system and a landing gear system among other devices. In embodiments, the attachment structure comprises a structural member, an aircraft pylon, an attachment member, a structural assembly, or a similar device used to join together structural components of an aircraft. The multi-purpose attachment structure is generally suited to aircraft and rotorcraft with attachment structures attached to wing and/or fuselage structures. A specific embodiment discussed herein depicts the attachment structure as pivotally attached to a boom while a wing bears the weight of the attachment structure and the boom structure during flight. Ground loads are not transferred to the boom structure but go directly to the wing spars, and conversely, boom bending loads are not transferred to the wing. The attachment structure is sufficiently stiff and strong that it supports aircraft jacking for ease of maintenance and modification. Mounting or integrating all these systems into a single structural element reduces overall design complexity and lowers the total aircraft mass. Additionally, the design allows for large adjustments of the X-axis relative position of the wing mounting structure to accommodate production tolerance errors. Non-adjustable wing-mounting variants may also be used in cases where adjustability is not required, without departing from the scope hereof.

The multi-purpose aircraft attachment structure performs at least the following functions: the attachment structure serves as a main connection member between primary aircraft structures (example: as a wing-boom connection); the attachment structure serves as a main landing gear structure; a control surface mechanism is integrated and attached to the attachment structure; the attachment structure can be adapted to serve as an attachment base for an array of aircraft structures, systems, equipment, etc.; the attachment structure comprises a flexible design that allows fine adjustments to compensate for manufacturing deviations; and the attachment structure is designed to enable fast and easy mounting/dismounting of aircraft systems, structures, equipment, etc.

In specific embodiments, the attachment structure is configured to provide a connection member between a wing structure and a boom structure. For example, the attachment structure may be rigidly mounted to the wing structure while the boom structure is pivotally mounted to the attachment structure. On different aircraft, the attachment structure can also be used for attaching other structures such as engines, military equipment, etc. to the aircraft wings as per a conventional pylon.

In an embodiment where the attachment structure is used as a main landing gear structure, a shock absorber, landing disc assembly, and weight-on-wheels system are all attached to the attachment structure. Landing gear components may be quickly inserted or removed from the attachment structure for servicing or repairs. Attachment points can be replaced to outfit the attachment structure with different types of landing gear.

In yet another embodiment, the attachment structure is configured for use with a control surface actuator. Components of control surface mechanisms can be attached to different attachment locations, thereby enabling various control surface mechanism designs to be integrated into the attachment structure. In embodiments, a servo motor is positioned inside the attachment structure and attached to the attachment structure with adaptors and bolts. Adaptors can be easily changed to accommodate different actuator types. Based on control surface mechanism design, different attachments can be used to mount a variety of mechanisms onto the attachment structure.

Figure 1B:
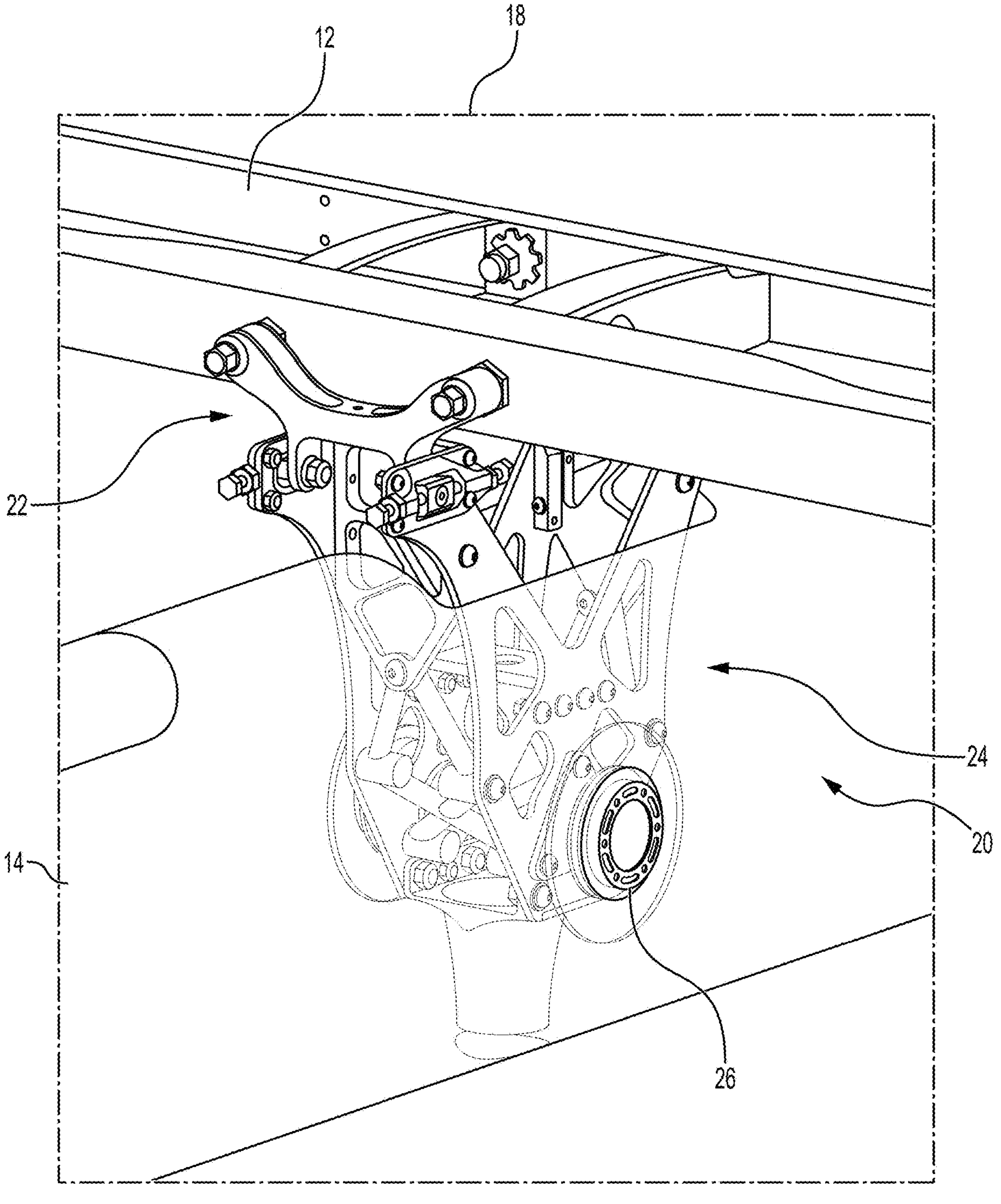
FIG. 1B is a close-up of the multi-purpose attachment structure assembly in the aircraft viewed in FIG. 1A with an aircraft boom depicted as semitransparent to demonstrate the mounting of the attachment structure within the boom.

Referring now to FIG. 1A, an aircraft 10 comprises a wing 12, a boom 14, and a tailfin structure 16. Wing 12 and boom 14 are secured to one another in region 18, which is a physical space shown in greater detail in FIG. 1B. Boom 14 is depicted as semitransparent in FIGS. 1A and 1B. As seen in FIG. 1B, wing 12 and boom 14 are mounted to a attachment structure 20. Attachment structure 20 comprises a top assembly 22 and a bottom assembly 24, wherein top assembly 22 attaches wing 12 to attachment structure 20 and bottom assembly 24 attaches boom 14 to attachment structure 20. Boom 14 is attached to bottom assembly 24 by pivot 26, such that wing 12 and attachment structure 20 may rotate relative to boom 14. In operation, boom 14 is substantially rigidly mounted to wing 12 such that boom 14 does not move or pivot substantially with respect to attachment structure 20. However, a small pivoting motion may occur with respect to attachment structure 20 due to elastic deformation of boom 14 during loading.

To summarize the features of attachment structure 20, attachment structure 20 is configured to provide a high stiffness to weight ratio as an assembly comprising multiple parts. Attachment structure 20 can be characterized as having two main subassemblies, namely a top assembly 22 and a bottom assembly 24. The design allows for mounting distance adjustability of both subassemblies. In embodiments, the adjustability range for each subassembly is −10 mm/+10 mm, but this range can easily be modified (enlarged or decreased) based on design requirements.

As later discussed alongside FIGS. 6A-6D, the bottom and top assemblies 22, 24 are joined together via adjustment brackets with shoulder screws. Adjustability is achieved with adjustment brackets comprising oval openings in which an adjustment bushing can slide left and right. Side bolts are used for adjusting the central adjustment bushing's position and for fixing the central adjustment bushing in place. Lock nuts prevent the unscrewing of any side bolts due to vibrations.

As later discussed alongside FIG. 2A, the bottom assembly 24 comprises multiple parts that create a box configuration. Each part contributes to the structural integrity of the attachment structure but also serves as an attachment point suitable for different applications. Adjustment brackets and central pivotal attachment bushings are attached to side plates. The side plates are interconnected with torsion cross links, torsion link brackets, a bottom radial support bracket, and a top bracket. Torsion cross links with torsion link brackets contribute significantly to the torsion stiffness of the attachment structure assembly. The bottom radial support bracket and top bracket together create a main structure for landing gear shock absorber mounting. All parts of bottom assembly 24 are joined together via bolted connections. A central pivotal attachment is used to attach boom 14 to wing 12 with attachment bushings and pins. Pins are inserted through bushings and axially fixed with bolts. A landing gear assembly is inserted through a bottom attachment structure opening and rigidly fixed to the top bracket via a shock absorber nut. The bottom opening serves as radial support for the shock absorber.

As later discussed alongside FIG. 7, the top assembly 22 attaches wing 12 to attachment structure 20 via a plurality of mounts configured on a set of brackets. Laminated pins are inserted into the mounts and wing 12, then fixed in place with pin bolts and a laminated nut. To mount a variety of wing structures, or to compensate for manufacturing defects, the position of top assembly 22 on the attachment structure 20 is adjustable via the plurality of adjustment brackets configured on the bottom assembly.

Figure 2A:
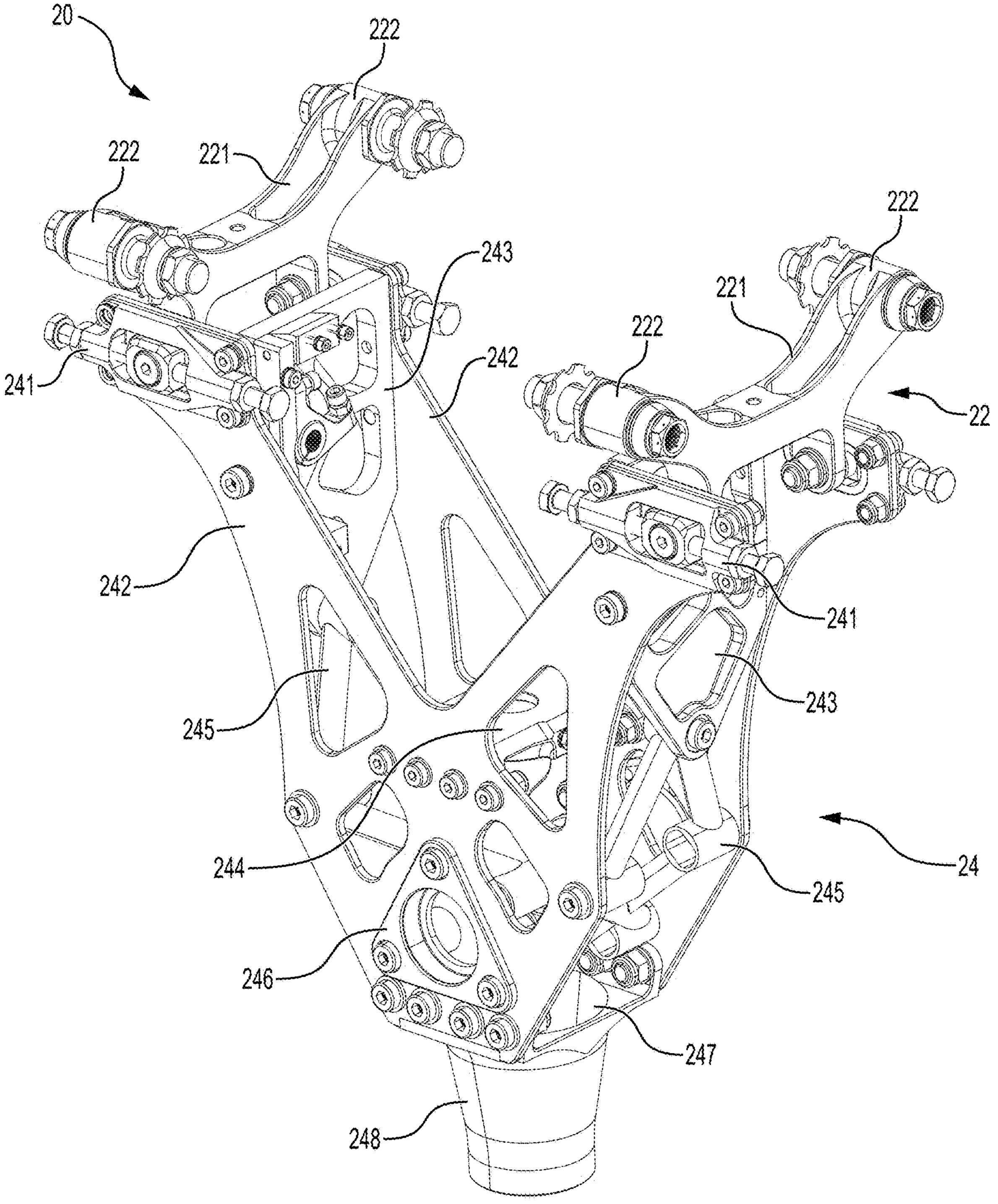
FIG. 2A is a view of a multi-purpose attachment structure for aircraft.

In FIG. 2A, attachment structure 20 is shown inside a transparent boom 14. Top assembly 22 comprises wishbone brackets 221 each configured with two wing spar pins 222. Each wishbone bracket 221 is connected to bottom assembly 24 via two adjustment assemblies 241. Bottom assembly 24 comprises adjustment assemblies 241, side plates 242, torsion link brackets 243, top bracket 244, torsion crosslinks 245, center pivotal attachment bushing 246, and bottom radial support bracket 247. Radial support bracket 247 comprises an extension 248 configured to house a portion of a shock absorber in a landing gear system. Extension 248 effectively elongates radial support bracket 247 in a vertical direction and comprises a hollow or otherwise empty space such that components may pass through extension 248 in the vertical direction. Center pivotal attachment bushing 246 may be attached to side plate 242 via a plurality of screws.

Side plates 242, torsion link brackets 243, and torsion crosslinks 245 comprise a rigid material such as alloy. Each side plate 242 comprises a structural truss suitable for weightbearing and also comprises slots, bolt holes, or female screws for mounting a plurality of components to the plate. Side plates 242 are mirror symmetrical in at least one dimension and are arranged vertically such that each side plate is parallel to one another with space between the plates. The top corners of side plate 242 may be substantially square such that components (including adjustable assembly 241) may be easily mounted to the top corners. Every side plate 242 used in attachment structure 20 may be identical and interchangeable, and fewer or more than two side plates 242 may be employed in alternate embodiments. The bottom of each side plate 242 is bolted (or otherwise mounted) to bottom radial support bracket 247 such that side plate 242 sits perpendicular to the base of bottom radial support bracket 247. Side plates 242 comprise cutouts to form triangular structures to improve rigidity and to remove weight. Torsion crosslinks 245 similarly comprise cutouts and triangular arrangements to minimize weight and maximize rigidity; to further increase the rigidity of attachment structure 20, each torsion crosslink 245 is bolted to both side plates 242 and one torsion link brackets 243. The rigid construction of bottom assembly 24 transfers loads from boom 14 to wing 12.

To take advantage of the strength and rigidity of attachment structure 20, a plurality of adaptors (not shown) for mounting other components to attachment structure 20 may be screwed into available slots, mounts, or bolt holes on side plates 242 or other portions of attachment structure 20 such as torsion link brackets 243. The adaptors may be modular such that a variety of components may be easily fitted to attachment structure 20, such as control surface mechanism 50 as discussed alongside FIGS. 5A-5C.

Figure 2B:
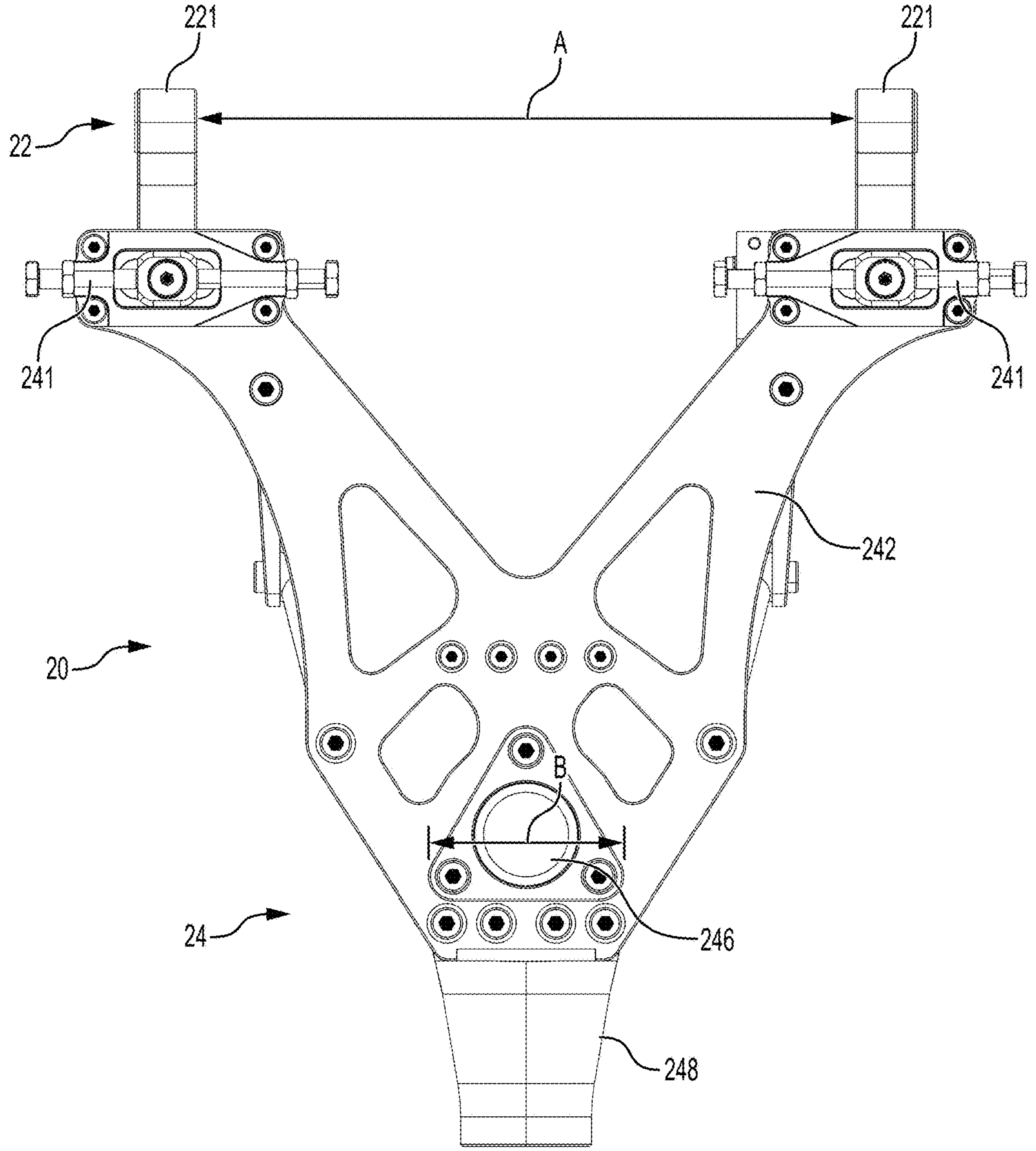
FIG. 2B is a side view of a multi-purpose attachment structure for aircraft.

FIG. 2B demonstrates the adjustable features of attachment structure 20. A distance 'A' between each wishbone bracket 221 may be adjusted via adjustment assemblies 241 to accommodate for various widths of wing 12 and to ensure a fit to top assembly 22 within production tolerance errors. Adjusting the position of wishbone brackets 221 also allows for adjustment of the relative X-position (see FIG. 1A) of wing 12 on aircraft 10, such that the wing may be moved forward or aft. A relatively large adjustment range of ±10 mm from standard for each wishbone bracket 221 allows for high tolerance of production errors and for attachment structure 20 to readily attach to varied wing/boom structures. Position B is the range of positions in which the top and bottom attachments are adjustable with respect to one another. For example, bottom assembly 24 may be slid forwards and backwards relative to top assembly 22 on adjustment assemblies 241, thereby adjusting position B, which alters the position pivotal attachment bushing 246 with respect to the top assembly 22.

Figure 3A:
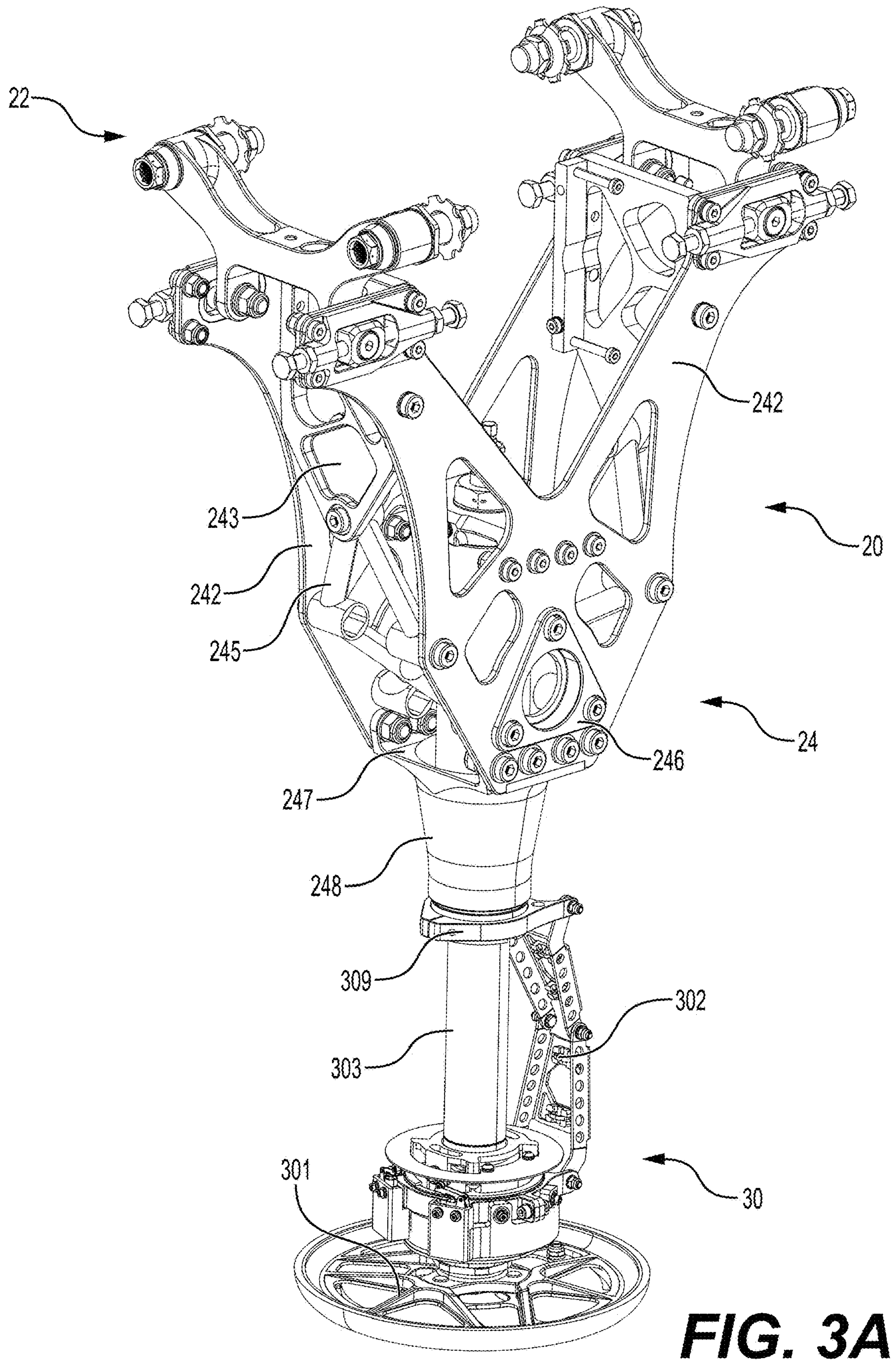
FIG. 3A is a view of a multi-purpose attachment structure configured with a landing gear system.

Referring now to FIG. 3A, attachment structure 20 is configured with a shock absorber 30 which serves as a landing gear system for aircraft 10. Other landing gear configurations, such as wheels, may be mounted on or integrated into attachment structure 20 without departing from the scope hereof. Shock absorber 30 comprises landing disc 301, weight-on-wheels system 302, piston 303, piston sleeve 304, and nut 305.

Figure 3B:
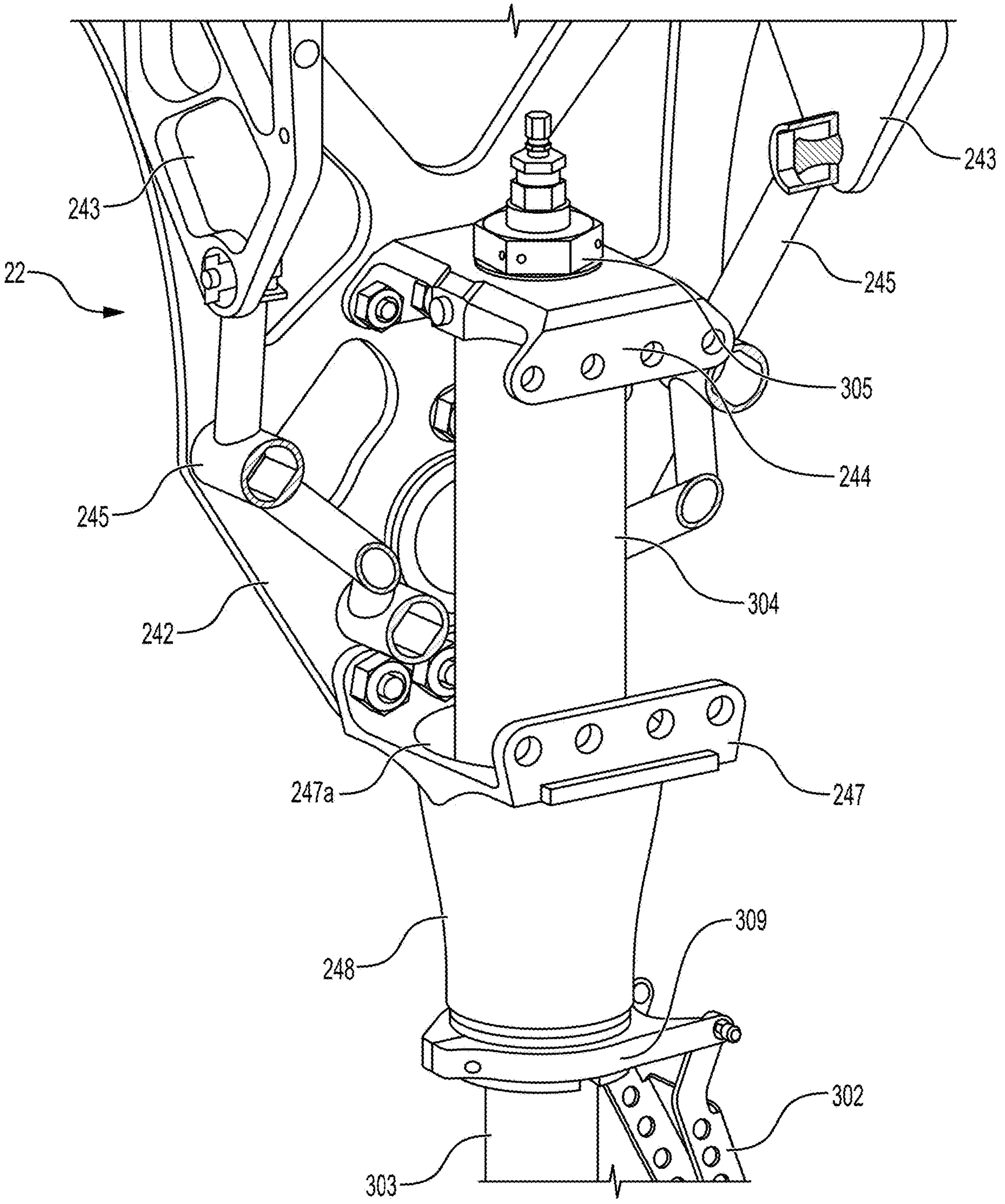
FIG. 3B is a cutaway view of a bottom assembly of a multi-purpose attachment structure configured with a landing gear system.

As seen in FIG. 3B, piston sleeve 304 is fixed between top bracket 244 and bottom radial support bracket 247. A portion of piston sleeve 304 is slotted through a vertical hole (not shown) in top bracket 244, and nut 305 is then screwed onto piston sleeve 304, thereby rigidly securing piston sleeve 304 to bottom assembly 24. Piston sleeve 304 further travels through a hole 247*a* in bottom bracket 247.

Figure 3C:
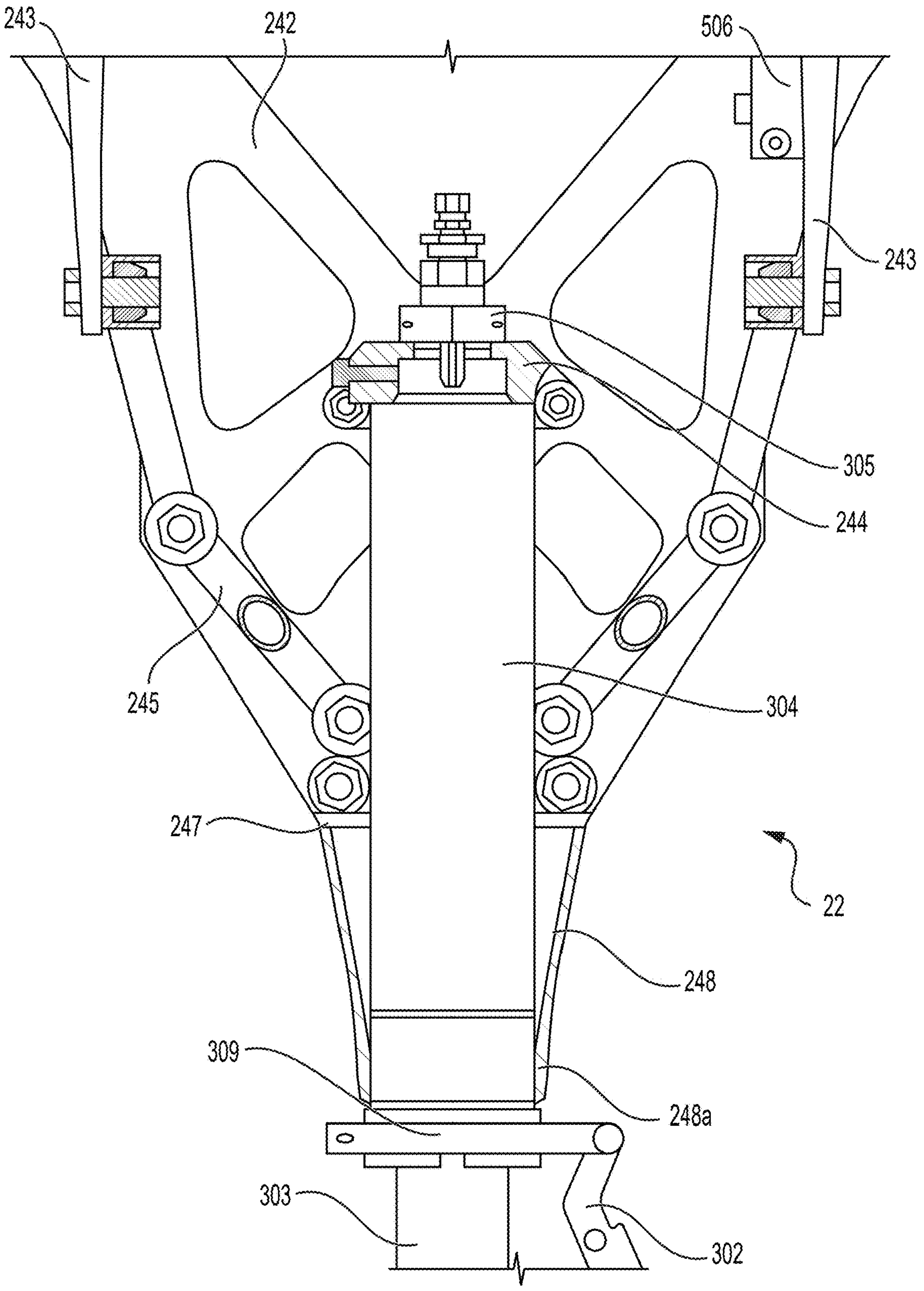
FIG. 3C is an alternate cutaway view of the multi-purpose attachment structure depicted in FIG. 3B.

A portion of piston sleeve 304 is disposed within bottom bracket 247 and encased within bottom bracket extension 248, as seen in FIG. 3C. Bottom bracket extension 248 may comprise an elongated semi-conical tube that partially encases piston sleeve 304. A snug portion 248*a* provides radial support for shock absorber 30 to maintain a rigid connection with attachment structure 20 and to hold piston sleeve 304 vertically. Piston 303 extends out of piston sleeve 304 as per a typical monotube shock absorber construction, wherein piston 303 may travel into piston sleeve 304. Bracket 309 is configured to mount weight-on-wheels system 302 for determining if aircraft 10 is resting on landing disc 301.

Figure 4:
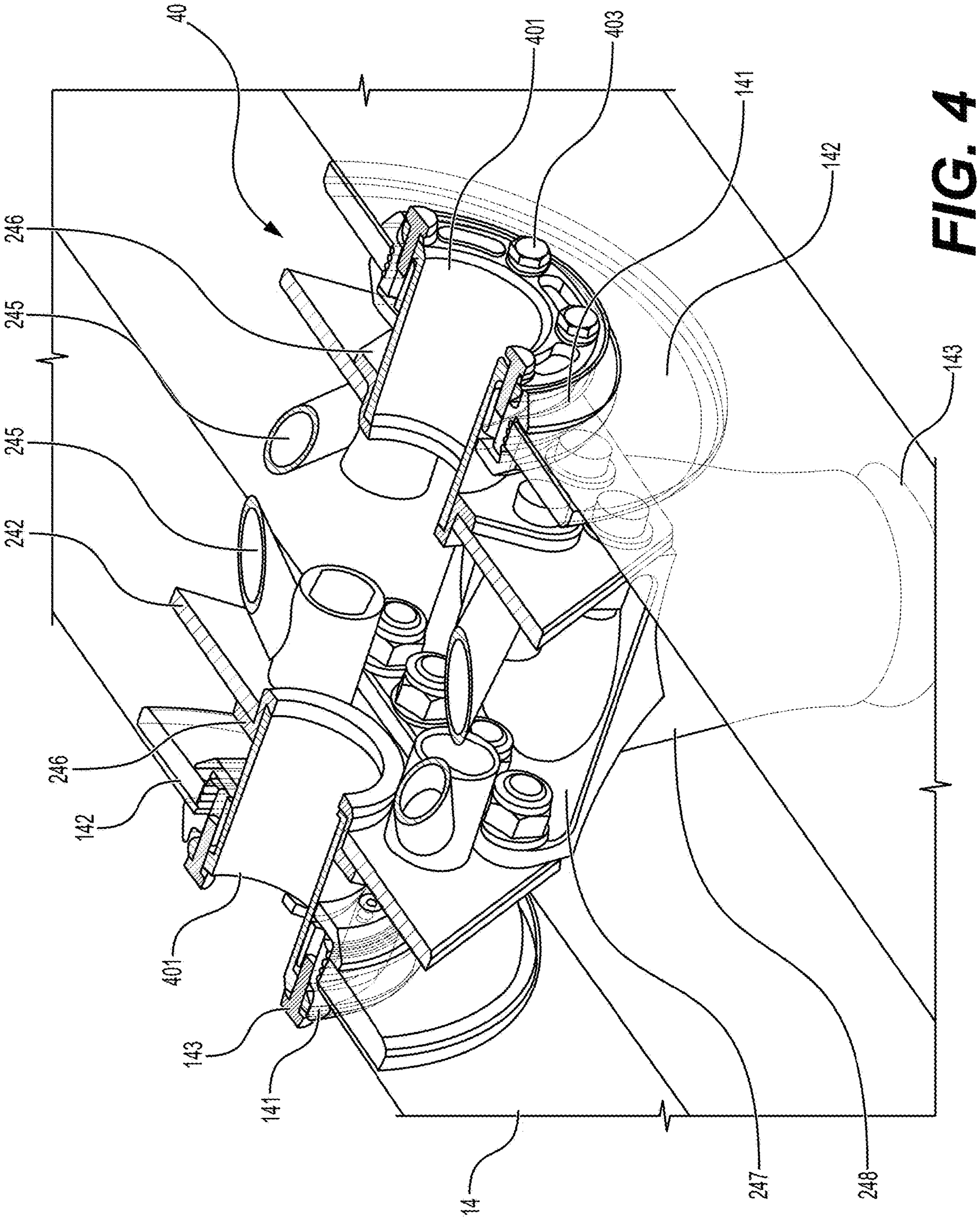
FIG. 4 is a view of a pivot mounting between a multi-purpose aircraft attachment structure and an aircraft boom structure.

Referring to FIG. 4, a cross-section of boom 14 (depicted as semitransparent) and attachment structure 20 shows that attachment structure 20 is pivotally attached to boom 14 via center attachment pins 401 configured in boom attachment bushings 141 on opposite sides of attachment structure 20 to produce a pivot system 40. A boom attachment bushing 141 may be disposed on each of opposite sides of boom 14 in a circular slot 142 such that boom attachment bushing 141 is free to rotate within circular slot 142. In embodiments, boom attachment bushing 141 may be outfitted in a different aircraft structure instead of a boom, such as a fuselage. Center attachment pin 401 is slotted into side plate 242 and center pivotal attachment bushing 246. A plurality of bolts 403 may be used to secure a flange 402 relative to boom attachment bushing 141 such that attachment structure 20 is constrained to rotate relative to boom 14 on center attachment pins 401. Center attachment pins 401 and flange 402 are inserted through the bushings and translationally fixed to boom 14 via bolts 403, leaving flange 402 interfaced with boom attachment bushing 141. Boom 14 additionally comprises a hole 143 through which shock absorber 30 or other landing gear devices may protrude.

Pivot system 40 allows attachment structure 20 and any components rigidly attached to attachment structure 20 to pivot with respect to boom 14. While center attachment pins are not rigidly fixed to any portion of attachment structure 20, center attachment pins 401 and flanges 402 are fixed to boom attachment bushing 141 via bolts 403, and boom attachment bushings 141 are free to rotate within circular slots 402: thus, a load applied to boom 14 may induce rotation of boom 14 without inducing a corresponding rotation of attachment structure 20.

Figure 5A:
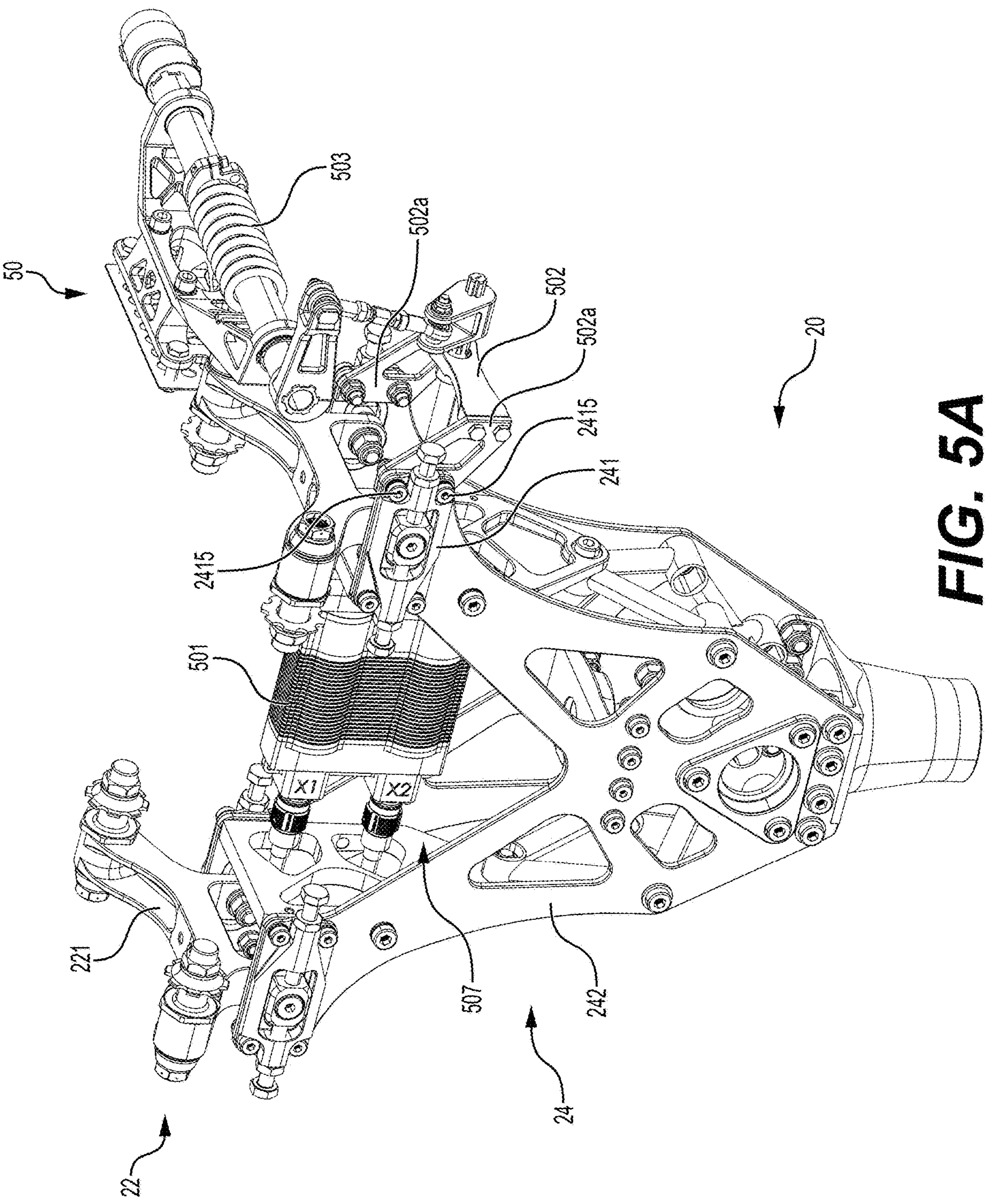
FIG. 5A is a view of a multi-purpose attachment structure configured with a control surface mechanism.

Referring to FIG. 5A, a control surface mechanism 50 may be structurally linked to attachment structure 20. A plurality of different control surface mechanisms may be configured on attachment structure 20 without departing from the scope hereof, and the exact workings of a particular control surface mechanism are not discussed. A variety of control surfaces or other aircraft components, such as sensors or military equipment, may be attached to attachment structure 20 via an adaptor such as adaptors 502*a*, which fit easily onto bolts configured in attachment points 2415 already used to mount adjustment assemblies 241.

Via another adaptor (now shown), an actuator 501 is rigidly fixed to attachment structure 20 in a space 507. Actuator 501 may comprise a servo motor, an electromechanical actuator, or another mechanical force/torque delivery device. An attachment structure mechanical linkage 502 is fixed to attachment structure 20 via adaptors 502*a* and mechanically linked to actuator 501, and a wing mechanical linkage 503 mechanically linked to attachment structure mechanical linkage 502 may be disposed on wing 12. In embodiments, control surface mechanism 50 pitches, yaws, or rolls an aircraft by adjusting control surfaces (not shown) in response to pilot commands sent to actuator 501: an input to actuator 501 activates the actuator and thus engages attachment structure mechanical linkage 502, then wing mechanical linkage 503, then any control surface (not shown) connected to wing mechanical linkage 503.

Figure 5B:
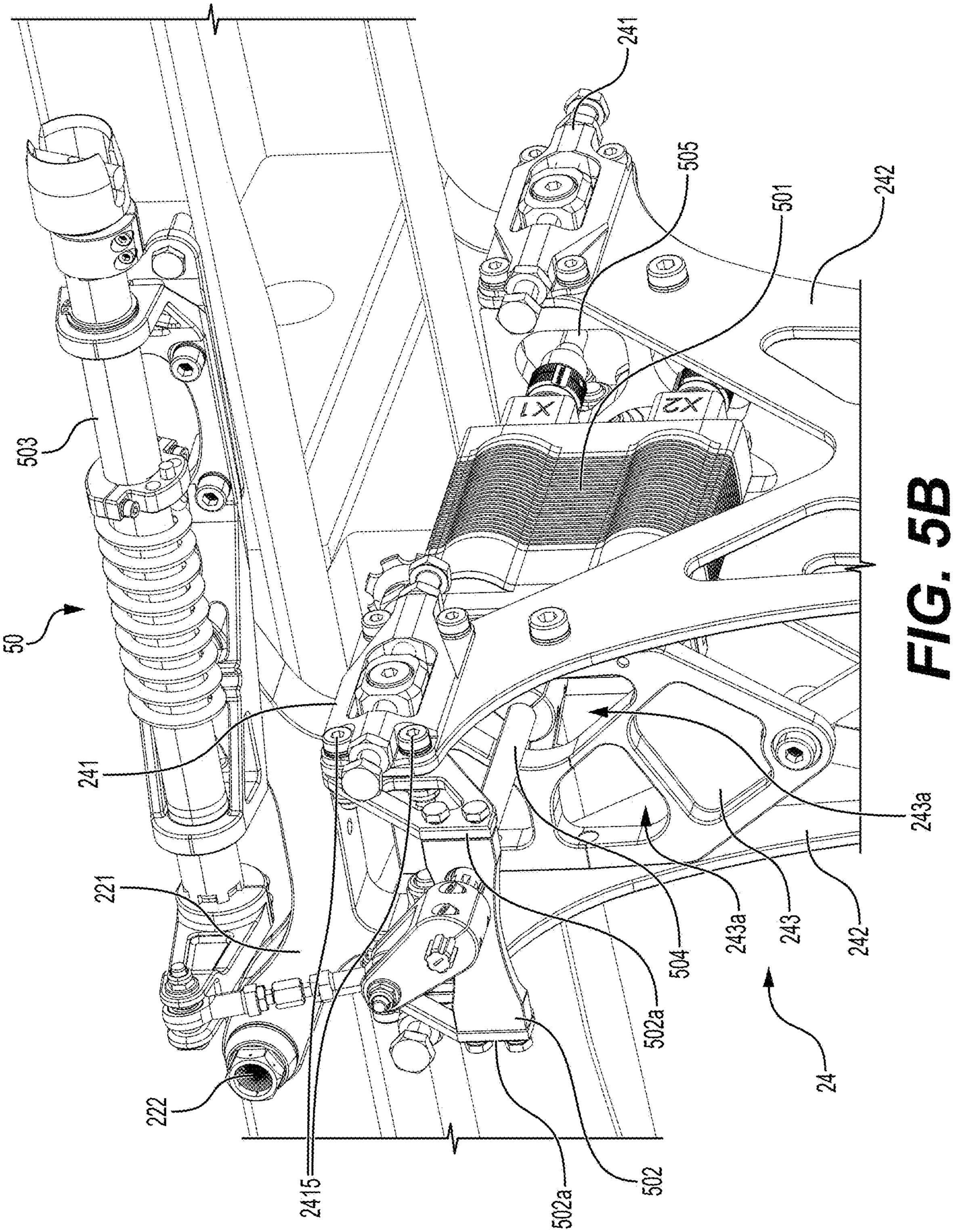
FIG. 5B is a close-up view of a multi-purpose attachment structure configured with a control surface mechanism, wherein the control surface mechanism is mounted to the attachment structure and to a wing structure.

As shown in FIG. 5B, attachment structure mechanical linkage 502 is fixed to side plates 242 on a lateral side of attachment structure 20 via adaptors 502*a*. A plurality of extending arms 504, 505 configured to transmit torque from actuator 501 to attachment structure mechanical linkage 502 may be disposed in one of a plurality of holes 243*a* in torsion link bracket 243 to provide for a compact design.

Figure 5C:
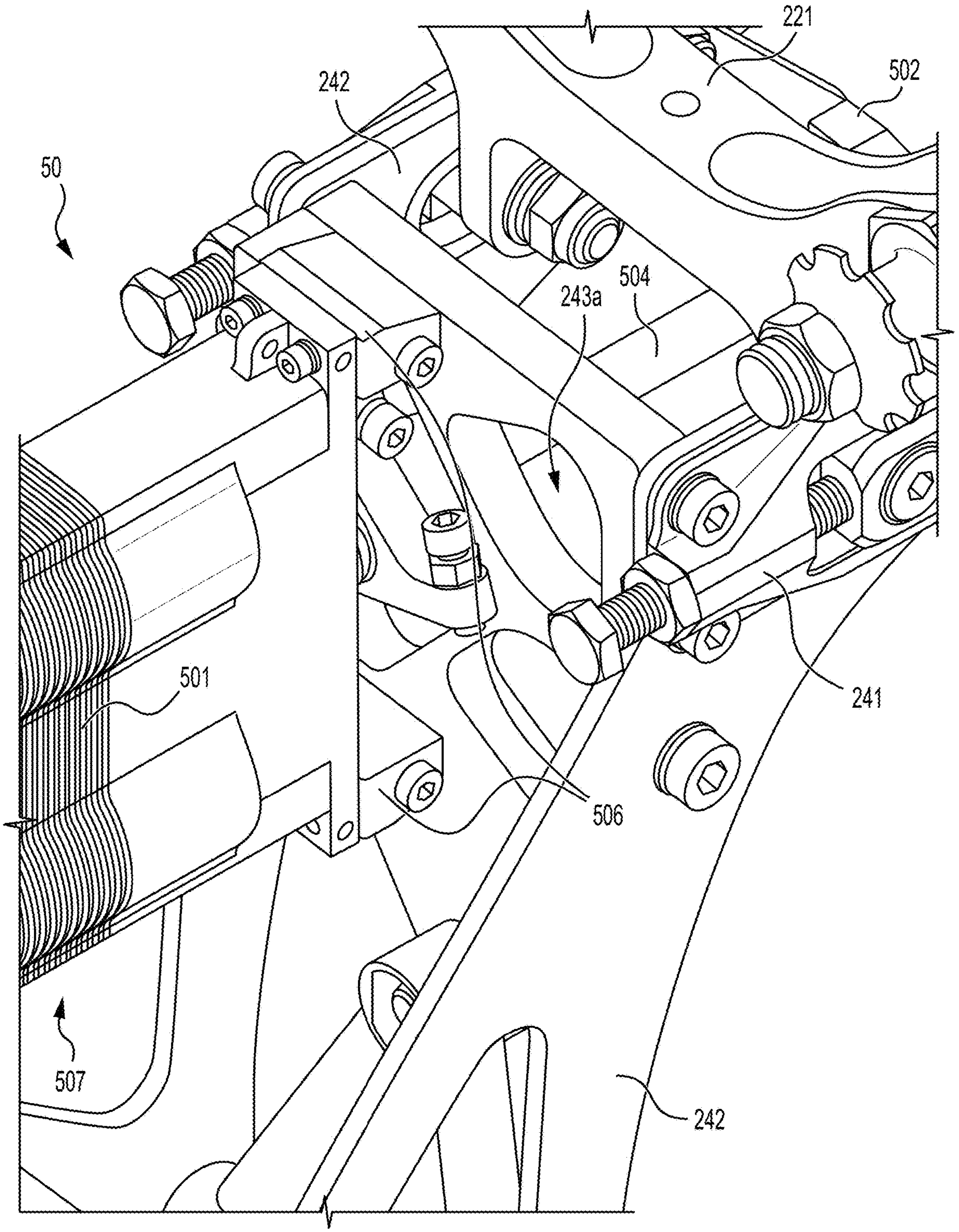
FIG. 5C is a close-up view of the multi-purpose attachment structure of FIG. 5A.

As seen in FIG. 5C, adaptors 506 provide rigid mounting points for actuator 501 on attachment structure 20 via a series of bolts and screws. Being modular, adaptors 506 may be integrated into a side plate 242, a torsion cross link bracket 243, another part of bottom assembly 24, or may be integrated into actuator 501 to provide a means of attaching actuator 501 or other components to bottom assembly 24.

Figure 6A:
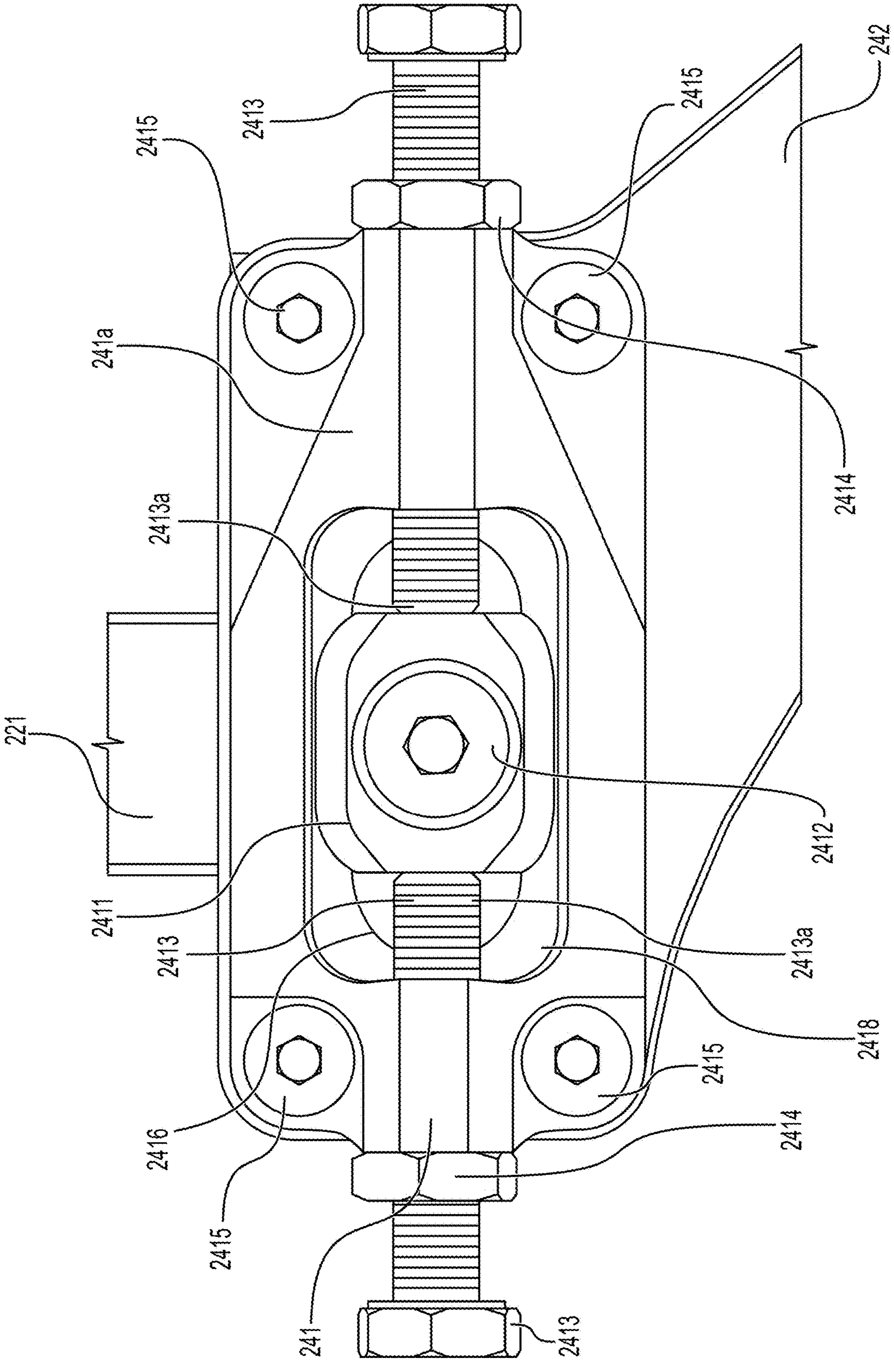
FIG. 6A is a front view of an adjustment bushing and screw.
Figure 6B:
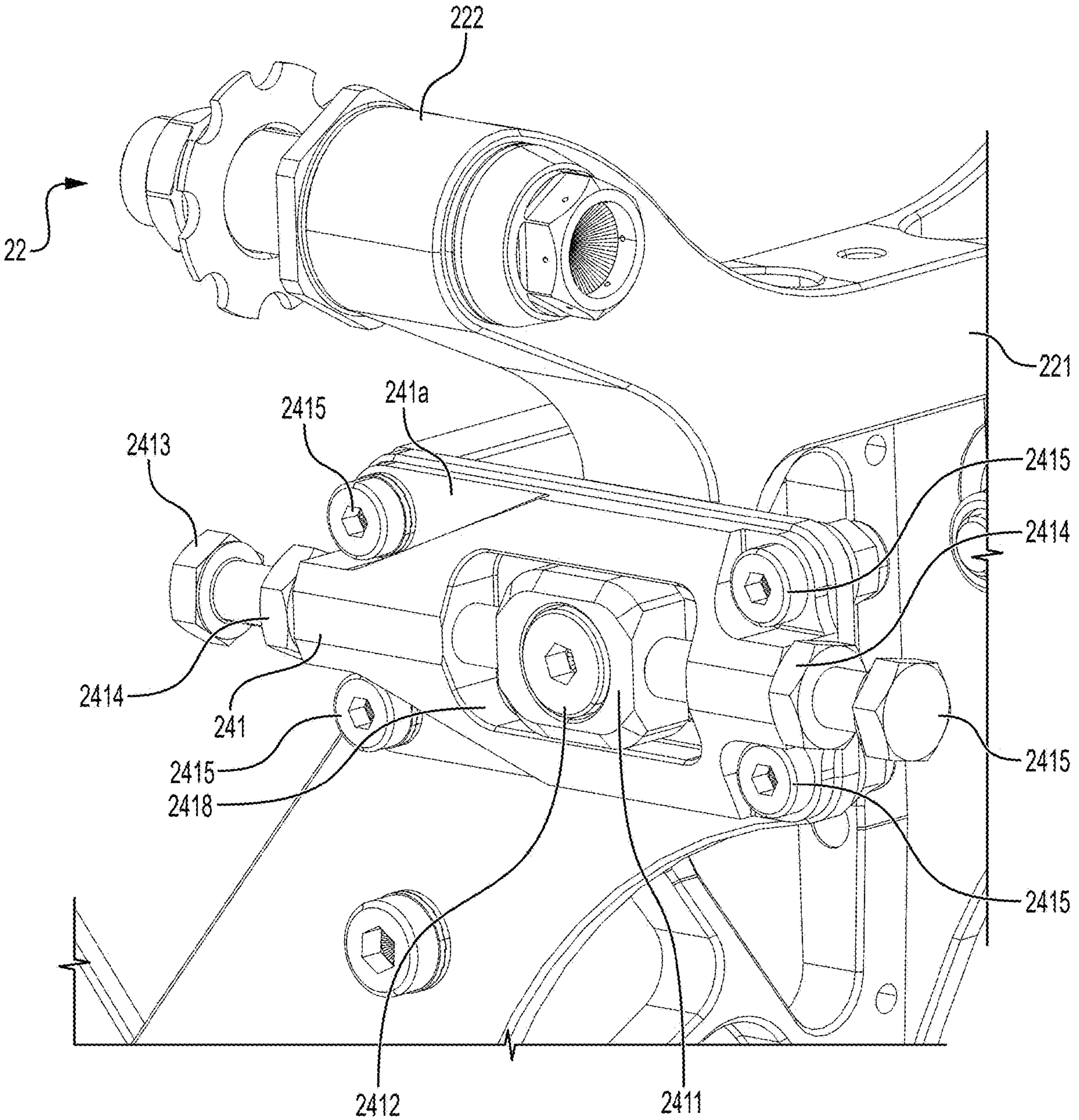
FIG. 6B is a perspective view of the adjustment bushing and screw.

Referring now to FIGS. 6A and 6B, a plurality of adjustment assemblies 241 are used to mount wishbone brackets 221 of top assembly 22 to side plates 242 of bottom assembly 24. Two adjustment assemblies 241 are configured on the top portions of each side plate 242, and each wishbone bracket 221 is sandwiched between two adjustment assemblies 241 on opposite side plates 242.

Each adjustment assembly 241 comprises a shell 241*a* surrounding a central adjustment bushing 2411 and comprising slots, bolt holes, or female screws to fit a shoulder screw 2412, side bolts 2413, lock nuts 2414, and four attachment points 2415. A cutout 2418 is also configured in each shell 241*a*. Each side plate 242 comprises oval slots 2416 each configured with a bushing 2417 (seen in FIG. 6C) for securing wishbone bracket 221 relative to side plate 242. A screw or bolt is configured as attachment point 2415 of adjustment assembly 241 to secure adjustment assembly 241 to side plate 242. Cutout 2418 comprises a similar width but a greater length than central adjustment busing 2411 such that central adjustment bushing 2411 may slide within cutout 2418 while remaining snug. To adjust the position of central adjustment bushing 2411 within cutout 2418, side bolts 2413 may be screwed in or out of their respective holes to reposition end portions 2413*a*. Side bolts 2413 are then tightened such that end portions 2413*a* press against central adjustment bushing 2411 to secure central adjustment bushing 2411 in place. Lock nuts 2414 are then tightened to secure side bolts 2413 in place and prevent loosening of side bolts 2413 due to vibrations during flight.

Figure 6C:
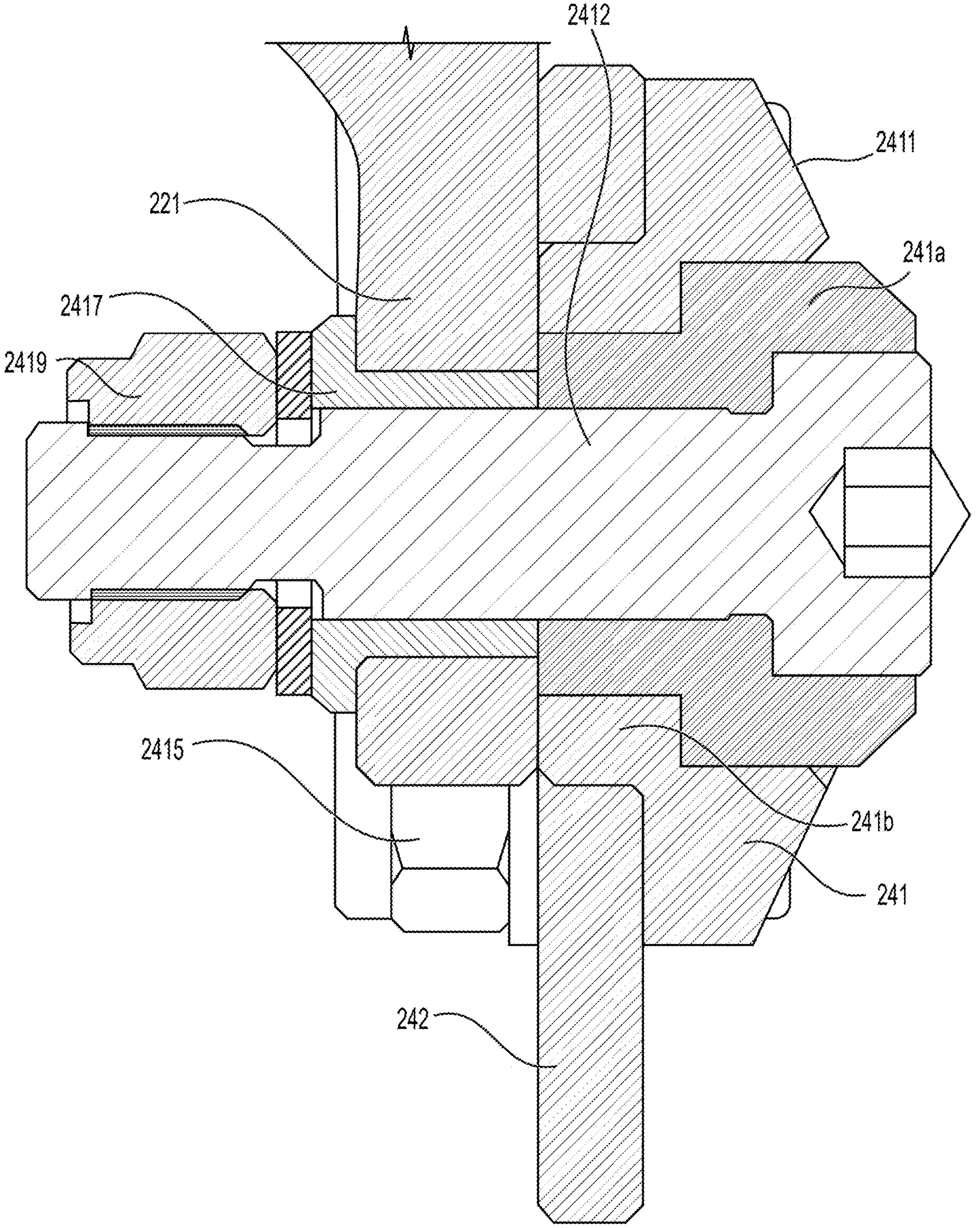
FIG. 6C is a cross-sectional side view of the adjustment bushing and screw.

FIG. 6C demonstrates a cross-sectional side view of a portion of adjustment assembly 241. Shoulder screw 2412 is secured in place via a nut 2419 tightened over second bushing 2417. The length of the shoulder screw extends from the end of the central adjustment bushing 2411 through second bushing 2417 to nut 2419. A portion 241*b* of shell 241*a* may be embedded within side plate 242.

Figure 6D:
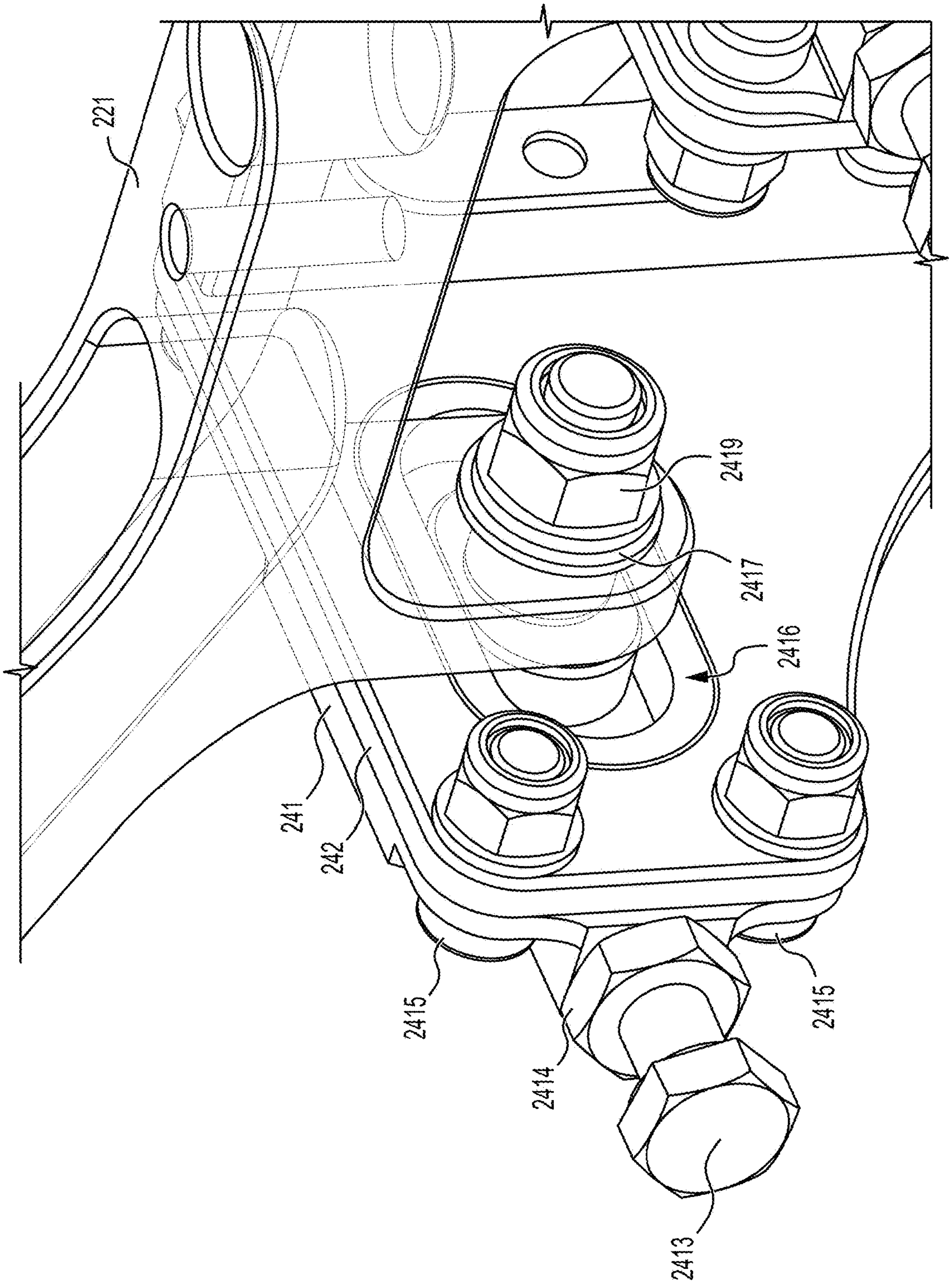
FIG. 6D gives another perspective view of the adjustment bushing and screw.

FIG. 6D depicts wishbone bracket 221 as semitransparent to show oval slot 2416 relative to wishbone bracket 221: central adjustment bushing 2411 may slide in oval slot 2416 to adjust the position of wishbone bracket 221 relative to side plate 242, and additionally may roughly comprise an oval shape to fit more snugly within oval slot 2416. Thus, the adjustment of components of adjustment assembly 241 adjusts the position of wishbone bracket 221. The adjustment assemblies 241 on both sides of wishbone bracket 221 may be adjusted together produce a straight alignment of wishbone bracket 221 relative to attachment structure 20, or a single adjustment assembly 241 may be adjusted to allow for a component with a slightly deformed shape but still within production working tolerance bounds to be fit to top assembly 22. The position of wishbone brackets 221 may also be adjusted to attach a component of greater width, or to adjust the relative X-position (see FIG. 1A) of wing 12 on aircraft 10.

Figure 7:
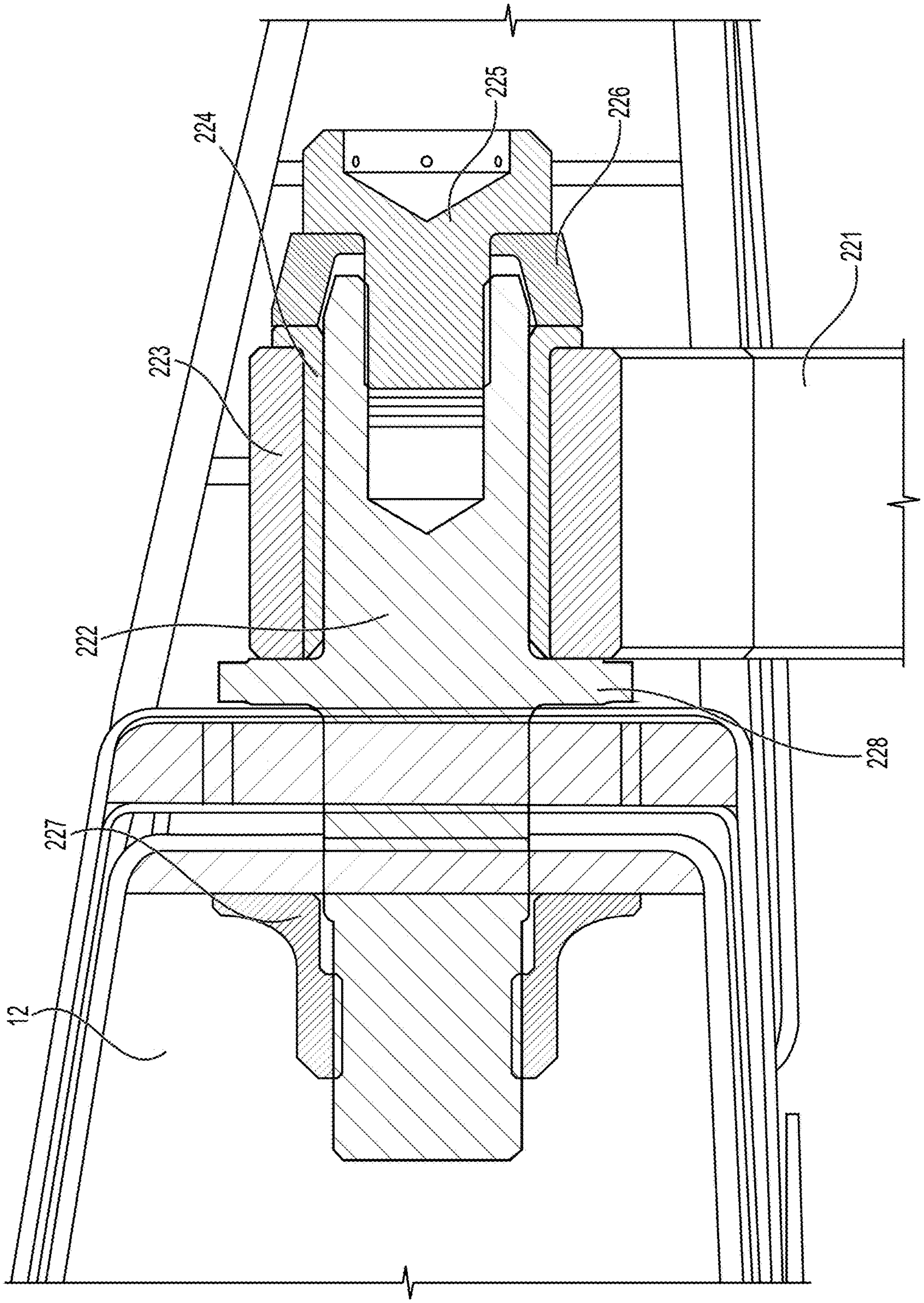
FIG. 7 is a view of a laminated pin configured in a wing and a mount in a top assembly.

Referring now to FIG. 7, each wishbone bracket 221 comprises two wing spar pins 222 configured in pin slots 223. Each pin slot 223 is configured with a bushing 224 through which wing spar pin 222 is inserted. A pin bolt 225 with a spacer 226 secures wing spar pin 222 in place on wishbone bracket 221; wing spar pin 222 further comprises a flange 228 such that flange 228 contacts one side of pin slot 223 while pin bolt 225 is screwed into wing spar pin 222 on the other side of pin slot 223 to secure wing spar pin 222 in place. Wing spar pin 222 further extends into a slot (not shown) on wing 12. Flange 228 contacts one end of the slot while wing spar pin 222 is secured into the slot via tightening a nut 227. Wing spar pin 222, nut 227, and flange 228 all comprise a laminated material. In embodiments, wing spar pin 222 is laminated into the composite structure of the wing 12. Specifically, wing spar pin 222 and nut 227 are firstly laminated/glued into a wing spar of wing 12 using manufacturing jigs. Wishbone bracket 221 is inserted onto the fixed wing spar pin 222 on wing 12 and secured in place with spacer 226 and pin bolt 225.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A structural mount in an aircraft, comprising:
- a bottom assembly comprising a plurality of rigid trusses disposed within an aircraft structure, wherein the bottom assembly is configured to pivot relative to the aircraft structure via a pivot mount;
- a plurality of adjustable mounts disposed on top of the bottom assembly;
- a top assembly mounted to the plurality of adjustable mounts, wherein adjusting the adjustable mounts adjusts a position of the top assembly; and
- a mechanical linkage mounted to the bottom assembly, wherein the mechanical linkage is configured to adjust a control surface external to the bottom assembly.

2. The structural mount of claim 1, comprising a servo motor disposed within the bottom assembly wherein the servo motor is configured to adjust the mechanical linkage.

3. The structural mount of claim 1, comprising a shock absorber mounted in the bottom assembly, wherein the shock absorber is rigidly secured in the bottom assembly.

4. The structural mount of claim 1, wherein the pivot mount comprises:
- a circular portion in the aircraft structure outfitted with an aircraft structure bushing;
- a structural mount bushing configured in a rigid truss;
- a center attachment pin disposed in the structural mount bushing and the aircraft structure bushing;
- a flange at an end of the center attachment pin and interfaced to the aircraft structure bushing; and
- a plurality of bolts securing the flange to the aircraft structure bushing,
- wherein the aircraft structure bushing is configured to rotate within the circular portion.

5. The structural mount of claim 1, wherein the top assembly comprises a wishbone bracket with a slot configured to mount to a wing of the aircraft.

6. The structural mount of claim 5, wherein the bottom assembly comprises a mounting slot for mounting an adjustment bracket, the adjustment bracket comprising:
- a shell with a cutout;
- a shoulder bolt;
- a central adjustment bushing in the cutout configured to receive the shoulder bolt;
- a side bolt configured in a side of the adjustment bracket, wherein an end of the side bolt is disposed in the cutout and tightening of the side bolt moves the end deeper into the cutout; and
- a lock nut configured on the side bolt for securing the side bolt in place,
- wherein the side bolt is tightened or loosened to adjust a position of the wishbone bracket by pushing against the central adjustment bushing.

7. The structural mount of claim 6, wherein the mounting slot comprises:
- an oval slot, wherein the central adjustment bushing comprises an oval shape configured to slide within the oval slot; and
- a second bushing configured in the wishbone bracket and disposed adjacent to the central adjustment bushing such that the shoulder bolt fits through the central adjustment bushing and the second bushing.

8. The structural mount of claim 6, comprising:
- a pin wherein the pin is slotted through the slot in the wishbone bracket;
- a slot in the wing structure wherein the pin is slotted through the slot in the wing structure; and
- a nut and a bolt configured on the pin for securing the wing structure to the wishbone bracket.

9. The structural mount of claim 8, wherein the top assembly comprises two wishbone brackets configured to mount a wing structure on two sides via slotting pins through the top assembly mounts and wing structure.

10. The structural mount of claim 9, wherein the position of the wing structure is adjusted by adjustment of the adjustment brackets.

11. An attachment structure for an aircraft, comprising:
- a bottom assembly, comprising:
  - a bottom bracket comprising a top hole and an extension with a bottom hole, wherein the extension is hollow such that a space exists through the bottom hole, the extension, and the top hole;
  - a side plate mounted to the bottom bracket wherein the side plate comprises a mirror-symmetric rigid truss arranged perpendicular to the bottom bracket;
  - a top bracket mounted on the side plate and configured with a hole, wherein the hole aligns with the top hole and the bottom hole of the bottom bracket;
  - a torsion link bracket mounted to the side plate;
  - a torsion crosslink, wherein the torsion crosslink is rigidly fixed to the torsion link bracket and to the side plate; and
  - a mounting slot disposed on a top corner of the side plate; and
- a top assembly, comprising:

a wishbone bracket, wherein the wishbone bracket is mounted via a shoulder bolt into a mounting slot of the bottom assembly; and a top assembly mount disposed adjacent to the mounting slot and configured for mounting the wishbone bracket.

12. The attachment structure of claim 11, wherein the bottom assembly is mounted within a boom structure and a wing structure is mounted on the top assembly.

13. The attachment structure of claim 11, comprising:

a shock absorber with a piston and piston sleeve, wherein the piston sleeve is slotted through the bottom hole, the extension, and the top hole of the bottom bracket and secured to the hole in the top bracket via a nut; and a landing disc secured to an end of the piston.

14. The attachment structure of claim 13, comprising a supporting region of the extension of the bottom bracket configured to snugly fit radially around the shock absorber.

15. The attachment structure of claim 12, comprising:

a plurality of modular adaptors configured to mount components to the bottom assembly;

an actuator mounted on an adaptor and disposed in a space of the bottom assembly;

a first mechanical linkage configured on the bottom assembly, wherein a force from the actuator engages the first mechanical linkage; and a second mechanical linkage configured on the wing structure, wherein a force from the first mechanical linkage is transmitted to the second mechanical linkage to adjust a control surface on the aircraft.

16. An aircraft structural member, comprising:

two side plates arranged opposite one another, wherein the two side plates are identical trusses each having vertical mirror symmetry;

a bottom bracket mounted between the two side plates at a bottom of each side plate, wherein the bottom bracket comprises a vertical hole and an elongated member;

a top bracket mounted between the two side plates above the bottom bracket, wherein the top bracket comprises a vertical hole;

two torsion link plates mounted between the two side plates;

two cross link members, each mounted to the two torsion link plates, the two side plates, and the bottom bracket;

a plurality of adaptors for mounting components to the structural member; and two top mount brackets, wherein the two top mount brackets are configured for mounting the aircraft structural member to a wing of the aircraft via pins, wherein the aircraft structural member is further mounted within a boom of the aircraft separate from the wing.

17. The aircraft structural member of claim 16, comprising:

a servo motor mounted on one of the two side plates via an adaptor;

an extending member extending from the servo motor and passing through an open space in one of the two torsion link plates; and a mechanical linkage mounted on at least one adaptor, wherein the extending member of the servo motor actuates the mechanical linkage when the servo motor applies a force.

18. The aircraft structural member of claim 16, comprising:

a pivot tube with a flange;

a pivot bushing disposed within each of the two side plates;

a boom pivot bushing disposed on opposite sides of the boom; and a boom pivot ring, wherein the boom pivot bushing is disposed in the boom pivot ring and the boom pivot bushing is free to rotate in one direction within the boom pivot ring, wherein the flange of the pivot tube is bolted into the boom pivot bushing such that the aircraft structural member pivots relative to the boom by rotating on the pivot tube.

19. The aircraft structural member of claim 16, comprising;

four adjustable mounting brackets, wherein two of the adjustable mounting brackets are disposed on each side plate, and wherein each adjustable mounting bracket lies opposite another adjustable mounting bracket on an opposite side plate for mounting components;

two oval slots configured on each side plate adjacent to the adjustable mounting brackets; and a shoulder bolt configured in the adjustment bracket and the oval slots, wherein the shoulder bolt mounts the top mounting brackets to the two side plates, and wherein a position of the top mounting brackets relative to the two side plates is adjusted by sliding the shoulder bolt within the oval slot.

20. The aircraft structural member of claim 16, comprising:

a shock absorber disposed in the vertical hole of the bottom bracket and the vertical hole of the top bracket, wherein the shock absorber is rigidly fixed to the aircraft structural member; and a landing gear secured to an end of the shock absorber.

* * * * *